United States Patent Office

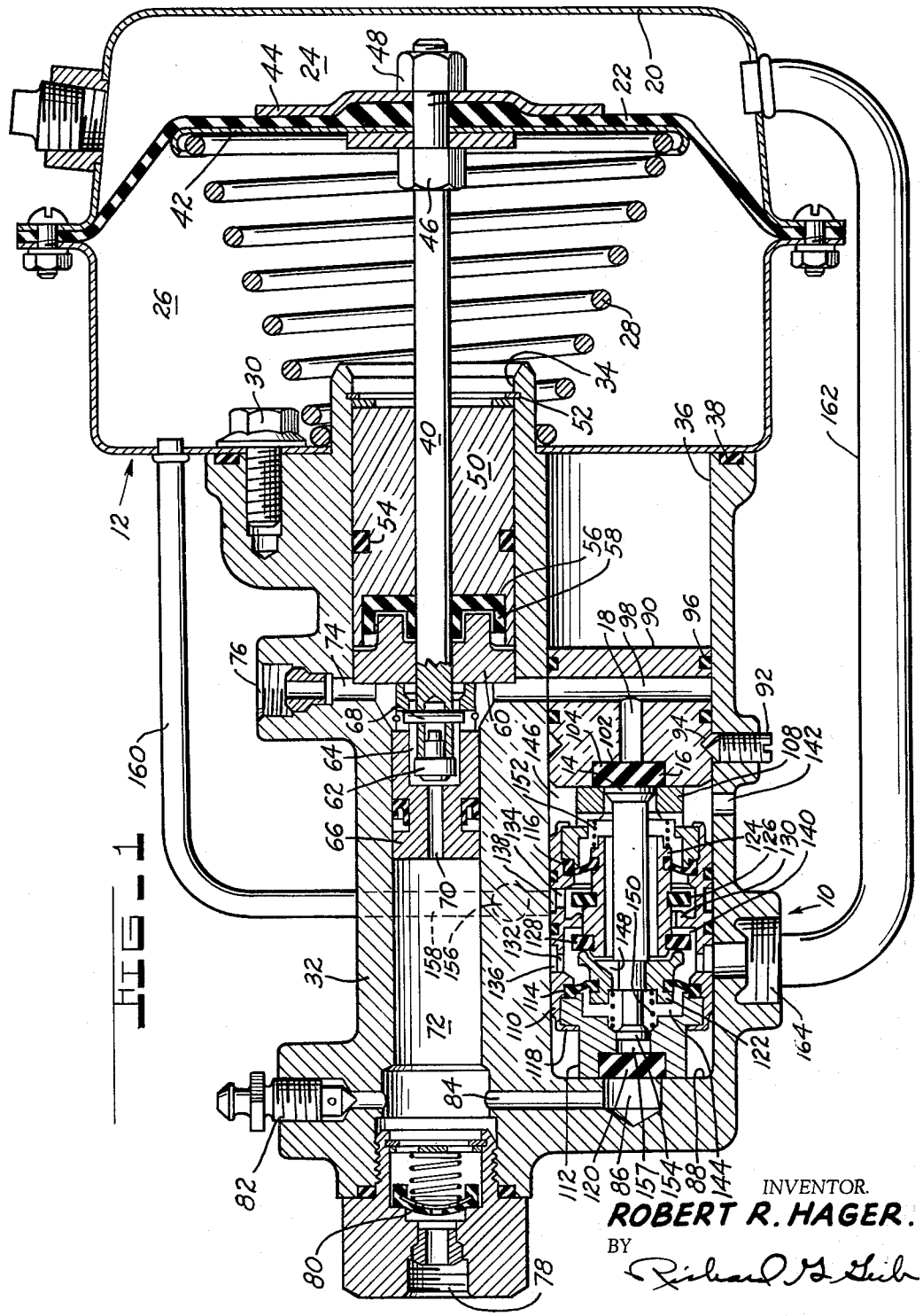

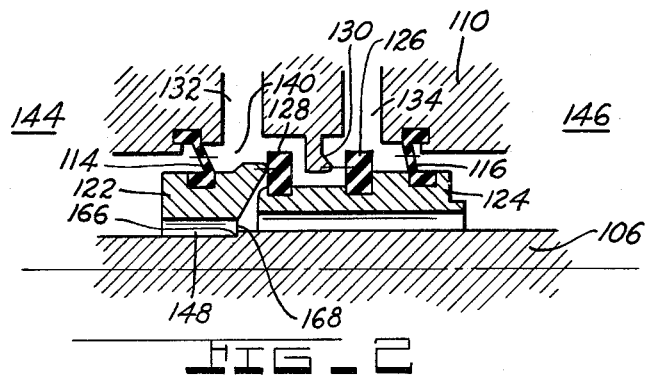
FIG_2
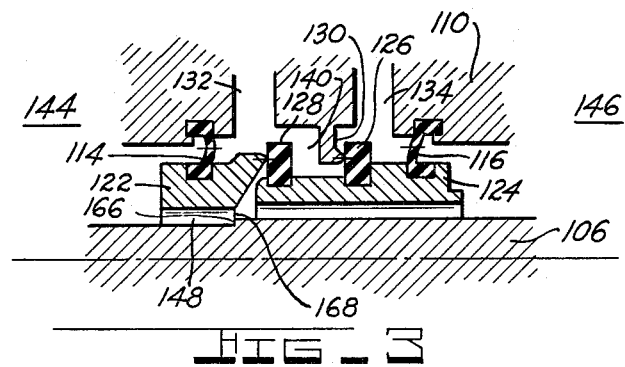
FIG_3
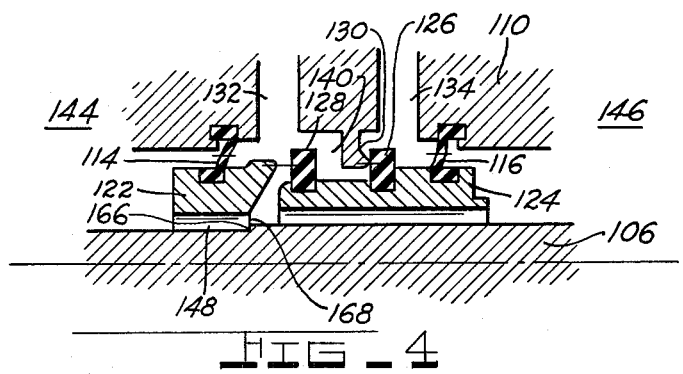
FIG_4
INVENTOR.
ROBERT R. HAGER.
BY
ATTORNEY.

3,259,146
Patented July 5, 1966

3,259,146
FLUID CONTROL MEANS
Robert R. Hager, South Bend, Ind., assignor to The Bendix Corporation, South Bend, Ind., a corporation of Delaware
Filed June 21, 1963, Ser. No. 289,486
2 Claims. (Cl. 137—627.5)

This invention relates to servomotor valve means arranged to utilize a differential in fluid pressure acting thereon to facilitate valve operation.

Control valves for servomotors have heretofore caused the designer problems. The principal interest of the servomotor designer has been that of rate of response. Thus, it is a principal concern of the designer that the valve means must be quick to lap to close off communication of control and release pressures to the servomotor so that the valve can modulate the servomotor between a fully actuated and a fully released condition. Furthermore, the valve means must not be subject to seal friction or fluid pressure restraint or the rate of response is slowed.

Therefore it is a principal object of the invention to provide a valve which does not have seal friction problems nor does it have fluid pressure restraint in its operation.

It is more particularly an object of this invention to utilize a mounting means for the valve means both as a sealing means for respective valve ports and as a means to suspend a poppet member of the valve means such that there is no pressure difference across the valve.

A still further object of the invention is to arrange valve seats and poppets within a valve housing with diaphragms of equal area such that the only force to overcome in operation is a simple light return spring.

Other and further objects will become apparent to those skilled in the art to which the invention relates from the following description of the accompanying drawings in which:

FIGURE 1 is a cross sectional view of a servomotor of one type within which the valve may be utilized; and FIGURES 2, 3 and 4 are blown up sections of the valve of FIGURE 1 in its released attitude, its lapped attitude and its applied attitude, respectively.

With more particular regard to FIGURE 1, the valve 10 is shown embodied in a HYDROVAC® type power brake unit 12. However, this is not to be deemed as limitative of the uses for which the valve is capable, e.g., the valve can be applied equally well with physical force in that the valve control rod 14 may be integrally connected to a manually operating mechanism rather than in abutment with a pressure responsive member 16 which makes rod 14 responsive to pressure within passage 18, as will be further detailed hereinafter.

With reference to the power brake unit, it is shown as a simple construction involving a two-part housing or casing 20 separated internally by a diaphragm 22 into a control chamber 24 and a constant pressure chamber 26 with a spring 28 operatively connected to the diaphragm 22 to bias the diaphragm to the rear of the housing, as shown. To the housing 20, we affix, as by bolts 30, a solid casting 32 that serves as an auxiliary boost unit.

The auxiliary boost unit, casting 32, is also shown of simple construction having a stepped bore 34 and a valve bore 36. A ring seal 38 seals the juncture of housing 20 with the unit 32. The stepped bore 34 is aligned with the centerline of the housing 20, and a push rod 40, that is connected to the diaphragm 22, as by backing plates 42 and 44 between nuts 46 and 48. The push rod 40 projects into the bore 34 and is supported therein by a bushing 50 held within the rear end of the bore 34 by a snap ring 52. The bushing 50 is provided with an annular seal 54 and the surfaces supporting the push rod 40 are smooth bearing surfaces to obviate frictional influences.

Adjacent the front end of bushing 50 a cup 56 is formed to receive a double lip seal 58 whose lips are spread by a retainer 60 to sealingly engage the cup 56 and the push rod 40.

The push rod terminates in a valve element 62 within a receiving chamber 64 of the pressure boost piston 66 connected by a lost motion device including pin 68 to the rod 40.

The piston is centrally apertured as at 70, such that, as shown, when the rod 40 is not urging movement of piston 66 the piston aperture allows fluid communication between a boost chamber 72 and a pressure producing mechanism (not shown) via an annular passage 74 and a port 76. The chamber 72 terminates in an outlet port 78 controlled by a residual pressure check valve 80 and adjacent thereto the unit 32 is provided with a bleed port 82 and a reaction passage 84 leading to a reaction chamber 86 opening into the forward end of the valve bore 36.

Within the valve bore 36 a control valve is clamped between the bore end wall 88 and an end closure 90. The end closure is held in place by set screw 92 threaded through casting 32 to enter a groove 94 in closure 90. As seen in FIGURE 1, the closure is provided with ring type seals 96 on either side of a passage 98 therethrough, which passage connects with a passage 18 normal thereto that terminates in a cavity 102 in closure 90. The cavity 102 is filled with a disc 104 that not only provides a seal but a force conductive member as well. The valve 10 is provided with a control rod 14 and is guided by an end piece 108 such that both the control rod and the end piece abut the disc 104. The end piece 108 actually serves to confine the peripheral edges of the disc while permitting central extrusion of the disc to operate the control rod 14. The control valve housing also includes a cylindrical shell 110 and an opposite end piece 112. The end pieces 108 and 112 are joined to the shell 110 by stamping or riveting over the ends of the shell 110, as at 118. However, before joining the shell and end pieces a pair of diaphragms 114 and 116 are interposed between the shell and end pieces and the valving details described below that are supported by the diaphragms are placed internally of the shell 110. The end piece 112 is provided with a cavity in which is placed a disc 120 similar to disc 104 in design and function. The disc 120 is held in this cavity due to the end piece 112 being held against wall 88 of the bore 36 such that the reaction chamber 86 opens over a substantial area of the disc for reasons hereinafter explained. It is thus readily seen that I have provided a valve means for a servomotor of a cartridge type.

Within the valve housing we mount, as by diaphragms 114 and 116, a ring valve seat 122 and a ring poppet retainer 124, respectively, such that a pair of poppets 126 and 128 straddle an annular valve seat 130 depending from the cylindrical shell 110 between a pair of radial openings 132 and 134 within the sidewalls of shell 110. The radial openings 132 and 134 lead to annular grooves 136 and 138, respectively, and, thus, communicate a cavity or chamber 140 internally of shell 110 with the grooves 136 and 138. As seen, the chamber 140 is confined between the diaphragms 114 and 116 internally of the shell 110. The control rod is of smaller cross section than the opening through retainer 124 to allow pressure from a port 142 in casing 32 to communicate to the end chambers 144 and 146 (via a passageway 148 through seat 122 to chamber 144). A pair of springs 150 and 152 are interposed to act between end piece 112 and seat 122 and between end piece 108 and retainer 124 to urge the seat and retainer together in the normal non-actuated condiiton whereby communication between port 142 and chamber 140 is closed off, as by the engagement of seat 122 with poppet 128. If desired, it is also possible to mold or form diaphragms 114 and 116 in such a way that the inherent forces within the diaphragms bias engagement of seat 122 and poppet 128, whereupon only a light valve return spring is needed to replace spring 150.

The diaphragms 114 and 116 are provided with central openings of smaller diameter than the receiving grooves of seat 122 and retainer 124 whereby the elastic forces in the diaphragm are great enough to grip these members under the expected operational conditions for the valve.

As may also be seen in FIGURE 1 the control rod 14 terminates in a reaction plunger 154 operating within an opening 157 in end piece 112 into which the disc 120 is extruded upon pressure build-up in chambers 72 and 86 to oppose movement of rod 14 in FIGURE 1 (rod 106 in FIGURES 2, 3 and 4) in a direct proportion to brake pressure developed in chamber 72. This will create a back pressure that will be biased against the pressure control forces in ports 76 that is communicated to disc 104 via passageways 74, 98 and 18.

In order to communicate either a control pressure or constant pressure as scheduled by the valve means aforedescribed to the servomotor section, I have provided a constant pressure port 156 in casing 32 leading to an internal passageway 158. Passageway 158 is connected to the valve bore 36 adjacent the annular groove 138 and to an external conduit 160 communicating this port 156 with the constant pressure chamber 26 of the servomotor 12. Another conduit 162 is connected to a port 164 opening outwardly in casing 32 from the bore 36 adjacent the valve's annular groove 136, and this conduit communicates port 164 with the control chamber 24 of the servomotor.

*Operation*

In operation the pressure producing mechanism (not shown), such as a conventional automobile master cylinder, sends a pressurized fluid to port 76 into passage 74 to cavity 64 of piston 66 and to passages 98 and 18 to act against disc 104. This pressurized fluid follows the path of least resistance and extrudes the disc to operate control rod 14 (control rod 106 of FIGURES 2, 3 and 4).

The normal non-energized position of the valve 10 is shown by FIGURES 1 and 2, and as the rod 14 is moved to carry seat 122 forward causing compression of spring 150, retainer 124 follows seat 122 until poppet 126 abuts fixed seat 130 as in FIGURE 3, which shows the lapped condition of the valve. Further pressure on disc 104 causes seat 122 to move away from poppet 128 opening passages 148 to chamber 140 while passage 134 is closed from chamber 140. Thus, a different pressure from port 142 (see FIGURE 1) is ported to control chamber 24. If, for example, vacuum is the pressure supplied to port 156, then the port 142 is open to atmosphere. Therefore, once the poppet 126 closes on seat 130 vacuum communication is closed off from chamber 24. Thereafter, when seat 122 is removed from poppet 128, atmosphere is opened to chamber 24 causing the diaphragm to operate push rod 40 and abuts valve 62 over the bore 70 and then moves piston 66 until reaction pressure in chamber 86 reaches a sufficient value to act on plunger 154 to again close seat 122 on poppet 128, as in FIGURE 3.

As seen in FIGURES 2, 3 and 4, the diaphragm centerlines (which are the light lines passing through the center of the diaphragms in each of the FIGURES 2, 3 and 4 and the seat center lines (which are the light lines connecting seat 122 and poppet 128 and seat 130 and poppet 126 in the same figures) show a greater diaphragm area as regards seat area and that the diaphragms are of equal area. This means that the seat and retainer are pressure balanced in that the pressure differentials across diaphragms 114 and 116 are equal due to equal area. By increasing the effective area of diaphragm 116 one may acquire a pressure assist in valve operation, and other modifications such as decreasing the effective area to provide pressure resistance follow this reasoning as will be appreciated by those skilled in the art.

In addition, and as seen in FIGURE 1, the length of reaction plunger 154 is shorter than the opening 157 to allow initial valve movement without opposing disc 120. This means that any reaction forces acting on disc 120 will not immediately act upon the reaction plunger 154. Therefore, the driver need only, in the version shown by FIGURE 1, overcome spring 150 in initial valve operation.

As indicated above, the practitioners in the field to which the invention relates may devise other forms for utilizing the invention without adherence to the above description. Therefore, it is not intended to be limited by this description but rather set forth that the true scope of my invention is to be reflected by the appended claims.

I claim:

1. In a fluid control system, a cartridge type valve body comprising:
    a valve housing including first and second end portions connected by a cylindrical portion, said cylindrical portion having a centrally located depending annular valve seat and radial openings in said cylindrical portion to either side of said annular valve seats;
    a ring valve seat;
    a first diaphragm connecting said ring valve seat to said housing, said first diaphragm biasing said ring valve seat inwardly from one of said end portions;
    a first spring in said housing and operatively connecting said first end portion and said ring valve seat and assisting said first diaphragm in biasing said ring valve seat inwardly of said one of said end portions;
    a poppet retainer of cylindrical construction;
    a second diaphragm connecting said poppet retainer to said housing, said second diaphragm biasing said retainer towards said ring valve seat;
    a second spring in said housing and operatively connecting said second end portion and said poppet retainer and assisting said second diaphragm in biasing said retainer toward said ring valve seat;
    a first poppet mounted on said retainer and adapted to cooperate with said ring valve seat;
    a second poppet mounted on said retainer and adapted to cooperate with said depending annular valve seat of said housing; and
    a valve operating means operatively connected to said ring valve seat to move said ring valve seat in opposition to said first diaphragm and said first spring means with said second spring means urging said poppet retainer to follow until said second poppet abuts said depending annular valve seat of said housing.

2. In a fluid control system, a cartridge type valve body comprising:
    a valve housing including first and second end portions connected by a cylindrical portion, said cylindrical portion having a centrally located depending annular valve seat and radial openings in said cylindrical portion to either side of said annular valve seat;
    a ring valve seat;
    a first diaphragm connecting said ring valve seat to said housing, said first diaphragm biasing said ring valve seat inwardly from one of said end portions;
    a first spring operatively connecting said housing in said ring valve seat and assisting said first diaphragm in biasing said ring valve seat inwardly of said one of said end portions;
    a poppet retainer of cylindrical construction;
    a second diaphragm connecting said poppet retainer to said housing, said second diaphragm having an equal effective area with regard to said first diaphragm, said second diaphragm biasing said retainer towards said ring valve seat;

a second spring operatively connecting said housing said poppet retainer and assisting said second diaphragm in biasing said poppet retainer into contact with said ring valve seat;

a first poppet mounted on said retainer and adapted to cooperate with said ring valve seat;

a second poppet mounted on said retainer and adapted to cooperate with said depending annular valve seat of said housing; and a valve operating means operatively connected to said ring valve seat to move said ring valve seat in opposition to said first diaphragm and said first spring means and to allow said second spring means to force said poppet retainer to follow until said second poppet abuts said depending annular valve seat of said housing.

References Cited by the Examiner

UNITED STATES PATENTS

| | | | |
|---|---|---|---|
| 3,075,502 | 1/1963 | Sadler | 60—54.6 |
| 3,099,941 | 8/1963 | Helvern et al. | 137—627.5 X |
| 3,115,067 | 12/1963 | Ayers | 91—391 |

MARTIN P. SCHWADRON, *Primary Examiner.*

M. CARY NELSON, *Examiner.*